(12) United States Patent
Lee et al.

(10) Patent No.: US 12,175,639 B2
(45) Date of Patent: Dec. 24, 2024

(54) METHOD AND APPARATUS FOR ENHANCING VIDEO QUALITY BASED ON MACHINE LEARNING

(71) Applicant: POSTECH Research and Business Development Foundation, Pohang-si (KR)

(72) Inventors: Seung Yong Lee, Pohang-si (KR); Jun Yong Lee, Pohang-si (KR); Hyeong Seok Son, Pohang-si (KR); Sung Hyun Cho, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 552 days.

(21) Appl. No.: 17/497,824

(22) Filed: Oct. 8, 2021

(65) Prior Publication Data
US 2022/0198616 A1  Jun. 23, 2022

(30) Foreign Application Priority Data
Dec. 21, 2020 (KR) .................. 10-2020-0180046

(51) Int. Cl.
*G06T 5/73* (2024.01)
*G06N 3/04* (2023.01)
(Continued)

(52) U.S. Cl.
CPC .................. *G06T 5/73* (2024.01); *G06N 3/04* (2013.01); *G06T 5/50* (2013.01); *G06T 7/248* (2017.01);
(Continued)

(58) Field of Classification Search
CPC ...... G06N 3/0464; G06N 3/02; G06N 3/0455; G06N 3/09; G06N 3/04; G06N 3/08;
(Continued)

(56) References Cited

U.S. PATENT DOCUMENTS

2022/0301295 A1* 9/2022 Livet .................... G06N 3/044

OTHER PUBLICATIONS

Zhou, S., Zhang, J., Pan, J., Xie, H., Zuo, W., & Ren, J. (2019). Spatio-temporal filter adaptive network for video deblurring. In Proceedings of the IEEE/CVF international conference on computer vision (pp. 2482-2491). (Year: 2019).*

(Continued)

*Primary Examiner* — Andrae S Allison
*Assistant Examiner* — Emmanuel Silva-Avina
(74) *Attorney, Agent, or Firm* — Morgan, Lewis & Bockius LLP

(57) ABSTRACT

A video quality improvement method may comprise: inputting a structure feature map converted from current target frame by first convolution layer to first multi-task unit and second multi-task unit, which is connected to an output side of first multi-task unit, among the plurality of multi-task units; inputting a main input obtained by adding the structure feature map to a feature space, which is converted by second convolution layer from those obtained by concatenating, in channel dimension, a previous target frame and a correction frame of the previous frame to first multi-task unit; and inputting current target frame to $N^{th}$ multi-task unit connected to an end of output side of second multi-task unit, wherein $N^{th}$ multi-task unit outputs a correction frame of current target frame, and machine learning of the video quality improvement model is performed using an objective function calculated through the correction frame of current target frame.

14 Claims, 5 Drawing Sheets

(51) Int. Cl.
*G06T 5/50* (2006.01)
*G06T 7/246* (2017.01)
*G06T 7/33* (2017.01)

(52) U.S. Cl.
CPC .... *G06T 7/337* (2017.01); *G06T 2207/10016* (2013.01); *G06T 2207/20076* (2013.01); *G06T 2207/20084* (2013.01)

(58) Field of Classification Search
CPC ...... G06N 20/00; G06N 3/045; G06T 3/4046; G06T 2207/10016; G06T 2207/20076; G06T 2207/20081; G06T 2207/20084; G06T 5/50; G06T 5/60; G06T 2207/20201; G06T 5/73; G06T 7/248; G06T 7/337; G06T 7/33; G06T 7/24; G06T 5/00; G06T 7/20
USPC .......................................................... 382/100
See application file for complete search history.

(56) References Cited

OTHER PUBLICATIONS

Zhan, Z., Yang, X., Li, Y., & Pang, C. (2019). Video deblurring via motion compensation and adaptive information fusion. Neurocomputing, 341, 88-98. (Year: 2019).*

Sunghyun Cho, et al., "Video deblurring for hand-held cameras using patch-based synthesis", ACM Transactions on Graphics, 31(4):64:1-64:9, 2012.

* cited by examiner

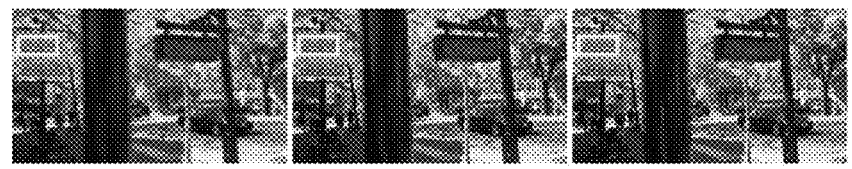
Input  IFIRNN  STEFAN
FIG. 6(a)  FIG. 6(b)  FIG. 6(c)
ESTRNN  Ours (4-stack)  Ours (10-stack)
FIG. 6(d)  FIG. 6(e)  FIG. 6(f)

METHOD AND APPARATUS FOR ENHANCING VIDEO QUALITY BASED ON MACHINE LEARNING

CROSS-REFERENCE TO RELATED APPLICATIONS

This application claims priority to Korean Patent Application No. 10-2020-0180046, filed on Dec. 21, 2020, with the Korean Intellectual Property Office (KIPO), the entire contents of which are hereby incorporated by reference.

BACKGROUND

1. Technical Field

Exemplary embodiments of the present disclosure relate to a video quality improvement technique, and more particularly, a video quality improvement method and apparatus based on machine learning, in which image quality improvement of a video including blur is performed based on structure-detail separation.

2. Related Art

In order to perform image quality improvement on video frames, most existing video quality improvement techniques use information on the surrounding frames of each frame. In addition, the surrounding frames are aligned with the frame for which image quality is to be improved, thereby achieving image quality improvement.

However, in the existing techniques, it is not easy to accurately align frames including blur, and on the contrary, incorrectly aligned frames cause deterioration in image quality improvement performance. In order to address this problem, as in a related-art document (Sunghyun Cho, Jue Wang, and Seungyong Lee, Video deblurring for hand-held cameras using patch-based synthesis, ACM Transactions on Graphics, 31(4):64:1-64:9, 2012), a progressive image quality improvement-compensation technique in which image quality improvement and compensation are repeatedly performed has been proposed, but the amount of computation required for the compensation is high, and thus there are restrictions on practical use.

As such, there is a need for a new approach for improving the image quality of a video including blur.

SUMMARY

Accordingly, exemplary embodiments of the present disclosure are provided to substantially obviate one or more problems due to limitations and disadvantages of the related art.

The present disclosure is directed to providing a video quality improvement method and apparatus based on machine learning, which allow multi-task units to harmoniously learn image quality improvement tasks and compensation tasks, which require feature maps with conflicting characteristics in the process of improving image quality of a video including a motion blur, by adopting a structure-detail separation-based learning structure to a video quality improvement network in which the multi-task units are stacked.

The present disclosure is also directed to providing a video quality improvement method and apparatus based on machine learning, which are capable of implementing multi-task units by a network module having a relatively low and light computation amount as compared with existing method and apparatus, and significantly improving deblurring performance by stacking a plurality of multi-task units and operating as progressive automatic image improvement and compensation units to effectively integrate the use of surrounding frames in video quality improvement, the compensation of the surrounding frames, and progressively performing image quality improvement and compensation.

According to a first exemplary embodiment of the present disclosure, a video quality improvement method, in which a video quality improvement model based on a convolutional neural network in which a plurality of multi-task units are stacked is machine-learned by a video quality improvement apparatus, may comprise: inputting a structure feature map converted from a current target frame, which is one of input frames, by a first convolution layer to a first multi-task unit and a second multi-task unit, which is connected to an output side of the first multi-task unit, among the plurality of multi-task units; inputting a main input obtained by adding the structure feature map to a feature space, which is converted by a second convolution layer from those obtained by concatenating, in a channel dimension, a previous target frame, which is another one of the input frames, and a correction frame of the previous frame, which is still another one of the input frames, to the first multi-task unit; and inputting the current target frame to an $N^{th}$ multi-task unit connected to an end of an output side of the second multi-task unit, wherein the $N^{th}$ multi-task unit outputs a correction frame of the current target frame, and machine learning of the video quality improvement model is performed using an objective function calculated through the correction frame of the current target frame.

The method may further comprise inputting an $N^{th}$ deblurred feature map of the previous target frame generated in the $N^{th}$ multi-task unit to the first multi-task unit and the second multi-task unit.

The method may further comprise receiving the main input by a first detail feature map network of the first multi-task unit and outputting a first detail feature map; and converting a structure-injected feature map in which the structure feature map is added to the first detail feature map by a motion layer of a compensation network of the first multi-task unit into a current frame feature map.

The method may further comprise estimating a motion between the current frame feature map and a previous frame feature map of the previous target frame by a motion compensation module of the compensation network and aligning a deblurred feature map of the previous target frame with the current target frame on the basis of the estimated motion.

The method may further comprise outputting a first deblurred feature map, in which the aligned deblurred feature map of the previous target frame is concatenated to the first detail feature map in the channel dimension through a concatenation network of the compensation network, to an input side of the second multi-task unit.

The method may further comprise converting the first detail feature map into an output residual image by a deblur layer of a first deblurring network of the first multi-task unit, and outputting a first correction frame to which the current target frame is added through a skip connection connected to an output side of the deblur layer, during training of the convolutional neural network, wherein the first correction frame is used to update a weight of the first multi-task unit.

The method may further comprise obtaining a root mean square deviation of the correction frame of the current target frame and a ground-truth frame to minimize an objective function, when the machine learning is performed.

The method may further comprise obtaining cross entropy for each pixel of a correlation matrix generated in each compensation network of the first multi-task unit and the second multi-task unit using a supervised optical flow generated from a supervised frame of the previous target frame and a supervised frame of the current target frame to minimize the objective function, when the machine learning is performed.

According to a second exemplary embodiment of the present disclosure, a video quality improvement apparatus based on machine learning may comprise: a first convolution layer configured to generate a structure feature map by converting a current target frame that is one of input frames; a second convolution layer configured to convert one obtained by concatenating, in a channel dimension, a previous target frame, which is another one of the input frames, and a correction frame of the previous target frame, which is still another one of the input frames to generate a feature space; a connection network configured to generate a main input in which the structure feature map is added to the feature space; a first multi-task unit based on a convolutional neural network, which is configured to receive the main input and the structure feature map and generate a first deblurred feature map of the current target frame through a first detail feature map network and a first compensation network; and an $N^{th}$ multi-task unit connected to an end of an output side of the first multi-task unit, and configured to receive the current target frame and output a correction frame of the current target frame through an $N^{th}$ detail feature map network and an $N^{th}$ deblurring network, wherein machine learning of a video quality improvement model is performed using an objective function calculated through the correction frame of the current target frame.

The apparatus may further comprise one or more multi-task units including a second multi-task unit between the first multi-task unit and the $N^{th}$ multi-task unit, wherein the second multi-task unit is connected to an output side of the first multi-task unit, receives the first deblurred feature map and the structure feature map, and generates a second deblurred feature map of the current target frame through a second detail feature map network and a second compensation network.

An $N^{th}$ deblurred feature map of the previous target frame generated in the $N^{th}$ multi-task unit may be input to one or more multi-task units including the first multi-task unit and the second multi-task unit.

The first multi-task unit may include the first detail feature map network configured to receive the main input and generate a first detail feature map, and the first compensation network configured to convert a structure-injected feature map, in which the structure feature map is added to the first detail feature map by a motion layer, into a current frame feature map.

The compensation network may include a motion compensation module configured to estimate a motion between the current frame feature map and a previous frame feature map and align a deblurred feature map of the previous frame with the current target frame on the basis of the estimated motion, and a concatenation network connected to an output side of the motion compensation module and configured to output the first deblurred feature map, in which the aligned deblurred feature map of the previous target frame is concatenated, in a channel dimension to the first detail feature map, to an input side of a second multi-task unit that is located at a rear end of the first multi-task unit in a signal flow.

The first multi-task unit may further include a first deblurring network configured to convert the first detail feature map into an output residual image using a deblur layer and output a first correction frame, to which the current target frame is added through a skip connection connected to an output side of the deblur layer, and the first correction frame may be used to update a weight of the first multi-task unit.

The apparatus may further comprise an optimization unit configured to obtain a root mean square deviation of the correction frame of the current target frame and a ground-truth frame to minimize the objective function.

A minimization unit further may minimize the objective function by obtaining cross entropy for each pixel of a correlation matrix generated in a compensation network of the first multi-task unit using a supervised optical flow generated from a supervised frame of the previous target frame and a supervised frame of the current target frame.

In the case of using the video quality improvement method and apparatus based on machine learning described above, multi-task units can harmoniously learn an image quality improvement task and a compensation task that require feature maps with conflicting characteristics by adopting a structure-detail separation-based learning structure in a video quality improvement network in which the multi-task units are stacked.

Further, a multi-task unit is implemented by a network module with a relatively light and very low computation amount as compared with the existing method and apparatus, and a plurality of multi-task units are stacked and implemented to operate as progressive automatic image quality improvement and compensation units, so that deblurring performance can be remarkably improved by using surrounding frames in video quality improvement, compensating the surrounding frames, and progressively performing the image quality improvement and the compensation.

Further, a structure-detail separation-based machine learning method and apparatus for progressive video quality improvement can be provided, thereby contributing to machine learning of a video quality improvement model being effectively performed.

Further, according to the present disclosure, there is an effect of being able to effectively improve image quality while reducing a high computation amount required for compensation, which was wasted in the related art, when multi-task units progressively perform image quality improvement and compensation, through a structure-detail separation-based learning method that allows the multi-task units to have a low computation amount.

BRIEF DESCRIPTION OF DRAWINGS

FIGS. 5(a) through 5(f) provide a set of views illustrating quantitative and qualitative results for the progressive deblurring-compensation by the video quality improvement apparatus of FIG. 1.

FIGS. 6(a) through 6(f) provide a set of views illustrating comparison of quantitative and qualitative results of the video quality improvement apparatus of FIG. 1 and comparative examples.

DETAILED DESCRIPTION OF THE EMBODIMENTS

Figure 1:
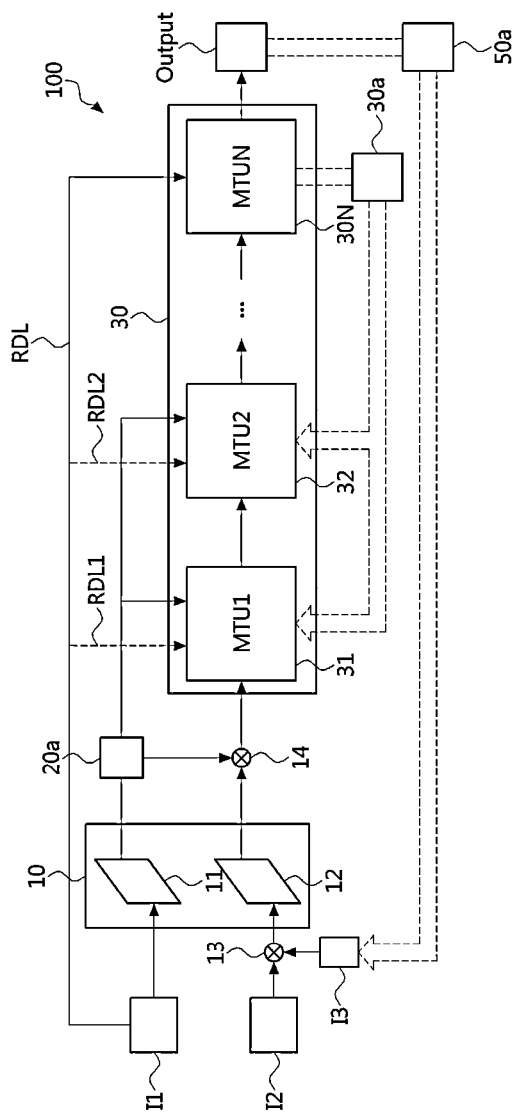
FIG. 1 is a block diagram of a video quality improvement apparatus based on machine learning according to one exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

First, before describing exemplary embodiments of the present disclosure in detail with reference to the drawings, it is noted that the present disclosure is configured to progressively perform image quality improvement and compensation while improving the quality of each frame of a video to effectively improve video quality. To this end, in the present disclosure, a plurality of multi-task units capable of performing image quality improvement and compensation are stacked, trained, and learned. In order to realize the progressive use of the multi-task unit, each multi-task unit should have a low computation amount. To this end, in the present exemplary embodiment, a structure-detail separation-based learning method is implemented. In the following description, as an example of the video quality improvement, a description will be made focusing on a learning method of the present disclosure, which is applied to video deblurring, and results thereof.

In addition, the need for the structure-detail separation-based learning may be briefly described as follows.

TABLE 1

| Compononts | w/o $\mathcal{M}$ Deblurring | | w/ $\mathcal{M}$ | | | |
|---|---|---|---|---|---|---|
| | | | Motion compensation | | Deblurring | |
| | PSNR | SSIM | PSNR | SSIM | PSNR | SSIM |
| w/o a long skip-connection | 29.44 | 0.909 | 26.73 | 0.897 | 29.83 | 0.914 |
| w/a long skip-connection | 29.78 | 0.913 | 24.14 | 0.832 | 29.94 | 0.916 |

Table 1 shows experimental results on the characteristics of a feature map required for deblurring and compensation. In this experiment, deblurring performance and motion compensation performance in cases, in which there is compensation M and there is no compensation M, and long skip-connection is used and not used, were evaluated based on peak signal to noise ratio (PSNR) and structural similarity (SSIM).

In order for progressive deblurring-compensation to be performed efficiently, a computation amount of the multi-task unit that performs the progressive deblurring-compensation should be low, and the characteristics of a feature map extracted by the multi-task unit should not conflict when the deblurring and compensation are performed. However, in consideration of the fact that effective deblurring may be performed only when the feature map of each multi-task unit includes detail information of an input frame, and the feature map should include structure information as well as the detail information of the input frame to perform effective frame compensation, in the present exemplary embodiment, the experimental results in Table 1 are referenced, and the long skip-connection is used so that the feature map includes the detail information when a neural network for improving video quality performs the deblurring. In that case, it can be seen that the deblurring performance was increased (see second and third columns of Table 1).

Meanwhile, it can be seen that, when the entire network performs the deblurring and the frame compensation M together, the performance of compensation may be improved when the feature map additionally includes the structure information through the long skip-connection (see fourth and fifth columns of Table 1). Thus, it can be seen that the characteristics of the feature map required for the deblurring and the frame compensation may be different from each other. That is, the characteristics of the feature map are different in the deblurring, detail and frame compensation, and a combination of a detail and a structure.

In addition, it can also be seen that, in the case in which the deblurring and the frame compensation are performed together, when the long skip-connection is used, the performance of compensation decreases, but the performance of deblurring is higher than when the frame compensation is not performed (see sixth and seventh columns of Table 1).

As such, it can be concluded that frame compensation has a great influence on deblurring performance, and thus, the present disclosure is directed to deriving higher deblurring performance by further improving frame compensation performance.

Based on the facts inferred through the above experiments, in the present disclosure, a structure-detail separation-based learning method is used, in which, when one multi-task unit performs deblurring-compensation, effective and efficient progressive deblurring-compensation may be performed by harmonizing the characteristics of the feature map, which conflict with each other.

The structure-detail separation-based learning method is implemented such that one multi-task unit maintains two separate feature map streams. A main stream for performing deblurring is implemented so that a detail feature map including detail information flows through the entire network, and an auxiliary stream for performing compensation is maintained in a structure feature map having structure information prepared by being converted in advance and is periodically joined to the main stream through which the detail information flows, and additionally necessary structure information is progressively included when each multi-task unit performs the compensation.

The structure-detail separation-based learning method may be learned to provide the feature map of the characteristics required by each task in the right place when the entire network performs multiple tasks (deblurring-compensation) to ensure a low computation amount of the multi-task unit, and may maintain two basic streams even when a plurality of multi-task units are stacked to enable efficient progressive deblurring-compensation to be performed.

The entire network structure of the above-described structure-detail separation-based learning method may be represented in FIG. 1.

FIG. 1 is a block diagram of a video quality improvement apparatus based on machine learning according to one exemplary embodiment of the present disclosure.

Referring to FIG. 1, a video quality improvement apparatus 100 according to the present exemplary embodiment includes an input conversion unit 10 and a multi-unit stack 30 including a plurality of multi-task units. The input conversion unit 10 includes a first convolution layer 11 and a second convolution layer 12, and the multi-unit stack 30 includes a first multi-task unit 31 (MTU1), a second multi-task unit 32 (MTU2) connected to an output side of the first multi-task unit 31, and an $N^{th}$ multi-task unit 30N (MTUN) connected to an output side of the second multi-task unit 32.

Here, N is an arbitrary natural number greater than or equal to two. When N is two, the $N^{th}$ multi-task unit 30N may be the second multi-task unit and the second multi-task unit 32 may be omitted. In addition, when N is three, other multi-task units added between the second multi-task unit 32 and the $N^{th}$ multi-task unit 30n may be omitted. In addition, when N is greater than three, at least one other multi-task unit is stacked between the second multi-task unit 32 and the $N^{th}$ multi-task unit 30N, and here, the $N^{th}$ multi-task unit 30N is connected to an output side of the last multi-task unit of the at least one other multi-task unit located at the farthest place in a signal flow from the second multi-task unit 32.

The input conversion unit 10 receives three input frames. The three input frames include a current target frame I1, a previous target frame I2, and a correction frame I3 (50a) of the previous target frame. In addition, the input conversion unit 10 converts the current target frame I1 through the first convolution layer 11 to generate a structure feature map 20a. In addition, the previous target frame I2 and the correction frame I3 of the previous target frame concatenated in the channel dimension through a concatenation operator or a concatenation network 13 are converted through the second convolution layer 12 to generate an input feature map corresponding to a feature space. A main input in which the structure feature map 20a is added to the feature space of the input feature map through another concatenation network 14 is input to the first multi-task unit 31.

The first multi-task unit 31 receives the main input and the structure feature map 20a, generates a first deblurred feature map of the current target frame through a first detail feature map network and a first compensation network, and generates a first correction frame, which is an image quality improvement frame of the current target frame, through the first detail feature map network and a first deblurring network, during learning. The first deblurring network may receive the current target frame I1 through a first branch path RDL1 of a residual detail learning path RDL. The first correction frame may be used to update weights of the first multi-task unit 31.

The second multi-task unit 32 receives the first deblurred feature map through a first input terminal thereof connected to the output side of the first multi-task unit 31, receives the structure feature map 20a through a second input terminal thereof, and generates a second deblurred feature map of the current target frame through a second detail feature map network and a second compensation network.

In addition, the second multi-task unit 32 generates a second correction frame, which is an image quality improvement frame of the current target frame through the second detail feature map network and a second deblurring network, during learning. At this point, the second multi-task unit may receive the current target frame I1 through a second branch path RDL2 of the residual detail learning path RDL. The second correction frame may be used to update weights of the second multi-task unit 32.

The $N^{th}$ multi-task unit 30N is connected to the end of the output side of the second multi-task unit 32, receives the current target frame I1 through the residual detail learning path RDL, and outputs a correction frame (final correction frame) of the current target frame through an $N^{th}$ detail feature map network and an $N^{th}$ deblurring network. The video quality improvement apparatus performs machine learning of a video quality improvement model using an objective function calculated through the final correction frame.

Here, an $N^{th}$ deblurred feature map 30a of the previous target frame I2, which is generated in the $N^{th}$ multi-task unit 30N, is provided to all other multi-task units including the first multi-task unit 31 and the second multi-task unit 32.

In addition, the video quality improvement apparatus 100 may further include an optimization unit configured to obtain a root mean square deviation of the final correction frame of the current target frame and a ground-truth frame to minimize the objective function. The minimization unit may further minimize the objective function by obtaining cross entropy for each pixel of a correlation matrix generated in the compensation networks of the first multi-task unit 31 and the second multi-task unit 32 using a supervised optical flow generated from a supervised frame of the previous target frame and a supervised frame of the current target frame.

A minimized value of the objective function corresponding to a loss function may be used to update weights of the convolution layer through the optimization unit having the same or similar configuration or function as the existing optimizer.

According to the present exemplary embodiment, the multi-task unit is configured as a detail feature map network, a deblurring network, and a compensation network based on a convolutional neural network, and the deblurring network and the compensation network share the detail feature map extracted from the detail feature map network, thereby effectively learning by performing image quality improvement and compensation in each of the multi-task units.

In that case, the deblurring network may be guided to learn such that the detail feature map generated through the detail feature map network includes the detail information of the current target frame, which is one of the input frames, through a skip connection that combines the output of the deblurring network and the current target frame.

In addition, the compensation network is designed to provide the structure feature map including pre-calculated structure information to each multi-task unit, and thus guided to learn such that the detail feature map generated through the detail feature map network includes only detail information rather than the structure information. To this end, the compensation network may be designed to combine the structure feature map including structure information of an input frame calculated in advance through one convolution layer to the detail feature map generated by the detail feature map network, and to synthesize a previously combined feature map through a motion layer composed of one convolution layer.

Figure 2:
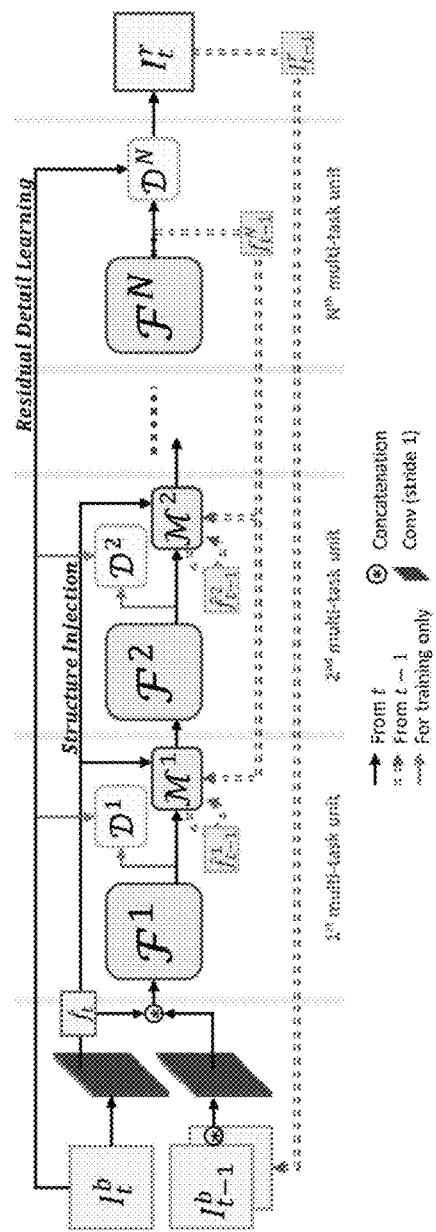
FIG. 2 is a block diagram illustrating the entire network architecture of the video quality improvement apparatus of FIG. 1.

FIG. 2 is a block diagram illustrating the entire network architecture of the video quality improvement apparatus of FIG. 1, and illustrates a deblurring network architecture for progressive deblurring-compensation learning based on structure-detail separation.

Referring to FIG. 2, the video quality improvement apparatus according to the present exemplary embodiment has a structure in which N multi-task units are stacked as a main network for deblurring. Each multi-task unit basically includes a detail feature map network $\mathcal{F}^n$, a deblurring network $\mathcal{D}^n$, and a motion compensation network $\mathcal{M}^n$ (see FIG. 3). Here, N is any natural number from one to N.

Here, the main network connects the current target frame $I_t^b$ and the deblurring network $\mathcal{D}^N$ through the skip connection for the structure-detail separation-based learning to induce residual detail learning and allow the feature maps of the correction frame passing through the deblurring network to include the detail information (main stream). The main stream operates only during learning.

In addition, a structure feature map $\hat{f}_t$ extracted in advance at a network starting portion of the video quality improvement apparatus is joined (auxiliary stream) to the compensation network of each multi-task unit, and the structure information is added to the detail feature map of the main stream, thereby enabling more accurate compensation.

More specifically, the video quality improvement apparatus receives a current target frame $I_t^b$, which is a $t^{th}$ motion blur frame, a previous target frame $I_{t-1}^b$, which is a $t-1^{th}$ motion blur frame, and a deblurred $t-1^{th}$ frame $I_{t-1}^r$.

The video quality improvement apparatus converts the frames into a feature map before the input frames enter the first multi-task unit.

The current target frame $I_t^b$ is converted into a structure feature map $\hat{f}_t$ including structure information through one convolution layer (a first convolution layer). The structure feature map $\hat{f}_t$ includes more structure information than the detail information of the frame because the input frame $I_t^b$ passes through one first convolution layer.

The previous target frame $I_{t-1}^b$ and the correction frame $I_{t-1}^r$ of the previous target frame are concatenated in the channel dimension and then converted into the feature map through another one convolution layer (a second convolution layer). The converted feature map is concatenated in the channel dimension to the structure feature map as a feature space and enters as an input of a first multi-task unit (a first multi-task unit).

Figure 3:
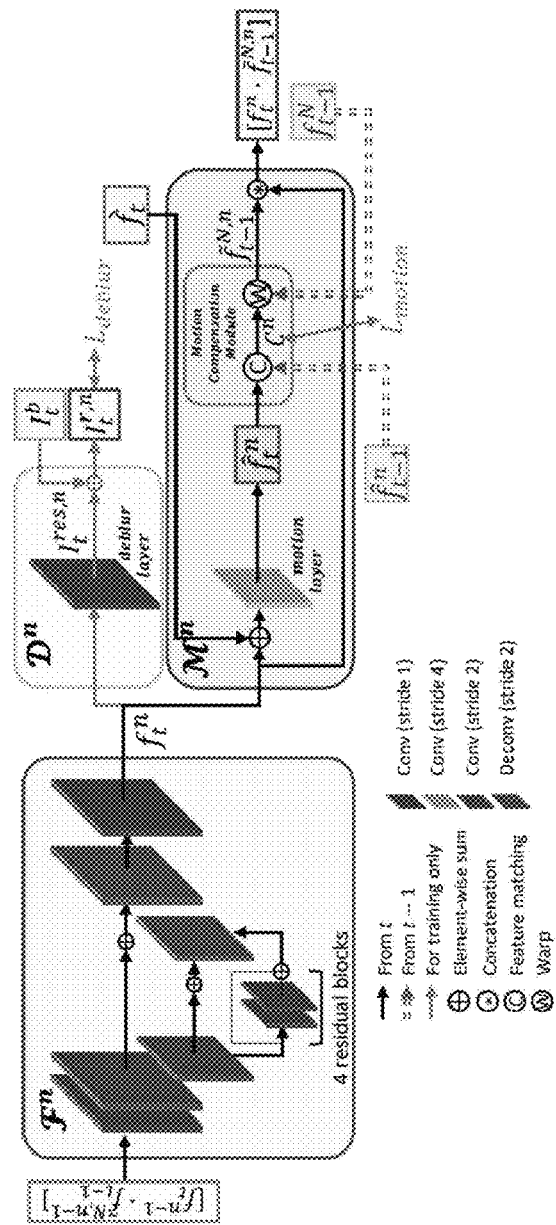
FIG. 3 is a block diagram illustrating a basic configuration of the multi-task unit of the video quality improvement apparatus of FIG. 2.

FIG. 3 is a block diagram illustrating a basic configuration of the multi-task unit of the video quality improvement apparatus of FIG. 2.

Referring to FIG. 3, the multi-task unit of the video quality improvement apparatus according to the present exemplary embodiment basically includes a detail feature map network $\mathcal{F}^n$, a deblurring network $\mathcal{D}^n$, and a compensation network $\mathcal{M}^n$.

Here, the multi-task unit may correspond to any one of the first multi-task unit, the second multi-task unit, and the $N^{th}$ multi-task unit. One of inputs of the second multi-task unit is connected to an output side of the first multi-task unit, one of inputs of the $N^{th}$ multi-task unit is connected to an output side of the second multi-task unit or an output side of a last multi-task unit of one or more other multi-task units disposed between the second multi-task unit and the $N^{th}$ multi-task unit. Here, N is an arbitrary natural number greater than or equal to three. However, when the multi-task unit is the $N^{th}$ multi-task unit, the multi-task unit may omit the compensation network $\mathcal{M}^n$.

The detail feature map network serves as a framework for maintaining the main stream that allows the feature map including the detail information to be maintained across the deblurring network in the structure-detail separation-based learning. The detail feature map network is composed of convolution layers of an encoder/decoder structure and receives outputs of multi-task units of n−1 previous frames as an input to generate a detail feature map $f_t^n$.

The detail feature map network $\mathcal{F}^n$ is shared by the deblurring network $\mathcal{D}^n$ and the compensation network $\mathcal{M}^n$. The deblurring network $\mathcal{D}^n$ converts the detail feature map $f_t^n$ into a residual frame $I_t^{res,n}$ including detail information required for deblurring through a deblur layer composed of one convolution layer, and generates a deblurred frame $I_t^{r,n}$ (hereinafter referred to as the first correction frame, the second correction frame, or the correction frame) by combining the residual frame $I_t^{res,n}$ with the current target frame $I_t^b$ connected by a skip connection. The skip connection causes the detail feature map network $\mathcal{F}^n$ to continue to include the detail information so that the residual frame $I_t^{res,n}$ includes more accurate detail information for more accurate deblurring during learning.

Meanwhile, the compensation network $\mathcal{M}^n$ that performs compensation first adds the structure information by combining the previously extracted structure feature map $\hat{f}_t$ to $f_t^n$, and synthesizes the structure information through a motion layer composed of one convolution layer to generate a detail-structure feature map $\hat{f}_t^n$ of the $N^{th}$ multi-task unit of a $t^{th}$ frame.

Thereafter, a motion compensation module included in the compensation network performs matching for each pixel on the basis of the correlation between $\hat{f}_{t-1}^n$ (a detail-structure feature map of the $N^{th}$ multi-task unit of a t−1$^{th}$ frame) and $\hat{f}_t^n$, and performs compensation on $f_{t-1}^N$ (the detail feature map of the $N^{th}$ multi-task unit of the t−1$^{th}$ frame) based on the matching to generate a deblurred feature map $\tilde{f}_{t-1}^{N,n}$.

In addition, the motion compensation module obtains a correlation for each pixel between the detail-structure feature map $\hat{f}_{t-1}^n$ of the $N^{th}$ multi-task unit of the t−1$^{th}$ frame (previous frame or previous target frame) and the detail-structure feature map $\hat{f}_t^n$ of the $N^{th}$ multi-task unit of the $t^{th}$ frame (current frame or current target frame), and extracts an optical flow based on an offset of coordinates of the matching pixel having a largest correlation value for each pixel.

Finally, the compensation network concatenates $f_t^n$ and $\tilde{f}_{t-1}^{N,n}$ in the channel dimension and transmits the concatenated $f_t^n$ and $\tilde{f}_{t-1}^{N,n}$ to an input of N+1$^{th}$ multi-task unit.

In the video quality improvement apparatus of the present exemplary embodiment, the first multi-task unit receives the structure feature map $\hat{f}_t$ and the feature map, in which the previous target frame $I_{t-1}^b$ and the correction frame $I_{t-1}^r$ of the previous target frame, which is the deblurred t−1$^{th}$ frame, are concatenated in the channel dimension, as inputs, and in the case of the $N^{th}$ multi-task unit, the compensation network is omitted, and the deblurring network $\mathcal{D}^N$ outputs a correction frame $I_t^r$ that is the final deblurring result (see FIG. 2).

According to the present exemplary embodiment, image quality improvement and compensation are progressively performed by the video quality improvement model designed by stacking multiple multi-task units designed based on structure-detail separation, thereby effectively generating the correction frame $I_t^r$ from the current target frame $I_t^b$. That is, the detail feature map output from the detail feature map network of the multi-task unit designed based on structure-detail separation, and the feature map of the residual frame in which the detail feature map generated in the last multi-task unit of the previous target frame is compensated through the compensation network are concatenated in the channel dimension, and are then input to the next multi-task unit, so that image quality improvement and compensation may be progressively and effectively performed by the plurality of multi-task units. Here, the last multi-task unit omits the compensation network and outputs the final correction frame $I_t^r$ through the skip connection of the deblurring network.

An objective function $L_{deblur}$ used for deblurring learning of the convolutional neural network, in which the plurality of multi-task units described above are stacked, is given by Equation 1 below, $$L_{deblur} = \sum_{n=1}^{N} \lambda_n MSE(I_t^{r,n}, I_t^{GT}). \qquad \text{[Equation 1]}$$

In Equation 1, MSE denotes a mean squared error. Further, in [Equation 1], $\lambda_n$=0.1 may be used when n∈{1, . . . , N−1}, and $\lambda_n$=1 may be used when n=N, $I_t^{GT}$ denotes a $t^{th}$ ground-truth frame.

Further, an objective function $L_{motion}$ used for compensation learning is given in Equation 2 below, $$L_{motion} = \sum_{n=1}^{N-1} \sum_{x=1}^{M} \sum_{i=1}^{D^2} C_t^{GT}(x, i)\log(softmax(C_t^n(x, i))) \qquad \text{[Equation 2]}$$

In Equation 2, $C_t^{GT}$ denotes a correlation matrix of $I_{t-1}^{GT}$ and $I_t^{GT}$, and $C_t^n$ denotes a correlation matrix of $\hat{f}_{t-1}^n$ and $\hat{f}_t^n$. x denotes a position for each pixel of the correlation matrix, M denotes a last position of the matrix, i denotes a channel position of the matrix, and $D^2$ denotes the entire channel of the matrix. In addition, softmax( ) denotes an activation function of the network.

Finally, an objective function $L_{total}$ for learning the entire network for deblurring is given in Equation 3 below, $$L_{total} = L_{deblur} + \alpha L_{motion}. \qquad \text{[Equation 3]}$$

In Equation 3, 0.1 may be used as a weight α of the objective function.

In addition, for additional deblurring network learning, a deblurring dataset including different blurs in most frames may be used as a video captured by a handheld camera.

For example, the dataset may include 71 pairs of motion blur video and clear video (supervised video), and may be composed of a total of 6,708 pairs of motion blur frames and clear frames with a resolution of 1280×720. Among these, ten pairs of videos are used as a test set and the rest may be used for network learning.

At the time of learning, 13 consecutive video frames per batch may be randomly extracted from the motion blur video and the clear video. Thereafter, an arbitrary position may be determined and video frames from which a patch of a resolution of 256×256 is extracted may be cropped.

The cropped motion blur frame may be expressed as $I_b^t$; t∈[1, . . . , 13], and the ground-truth frame may be expressed as $I_t^{GT}$; t∈[1, . . . , 13] (see Equations 1 and 2). A=batch size may be set to eight, and an Adam Optimizer set to $\beta_1$=0.9 and $\beta_2$=0.999 may be used. During network learning, a learning rate of may be used for the first 400,000 iterations, and a learning rate of 2.5×10$^{-5}$ may be used for the remaining 200,000 iterations.

Figure 4:
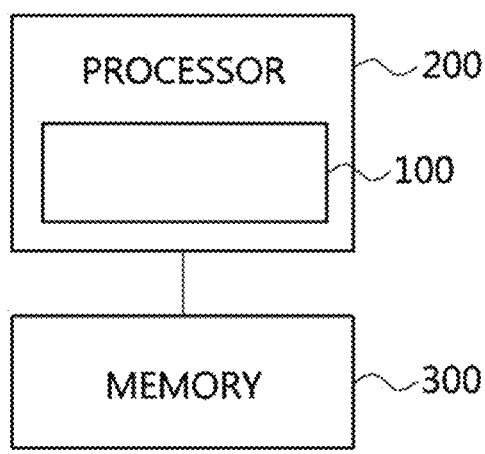
FIG. 4 is a block diagram for describing a modified example of the video quality improvement apparatus of FIG. 1.
Figure 4:
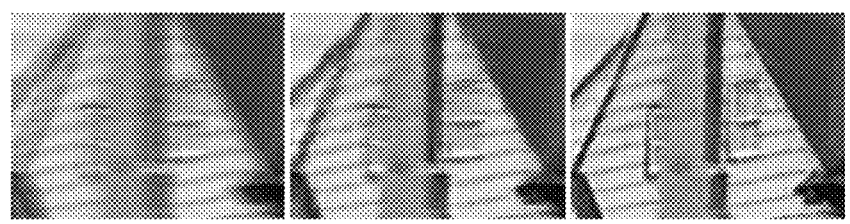
Figure 4:
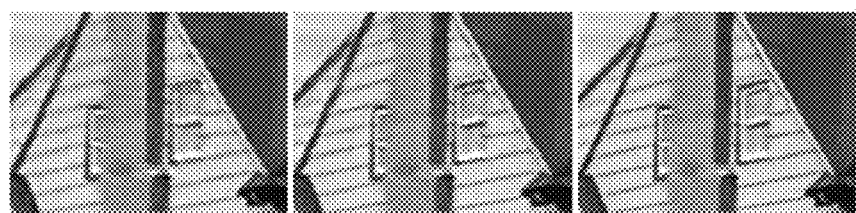

FIG. 4 is a block diagram for describing a modified example of the video quality improvement apparatus of FIG. 1.

Referring to FIG. 4, a video quality improvement apparatus according to the present exemplary embodiment includes a processor 200 and a memory 300. The video quality improvement apparatus 100 described above with reference to FIG. 1 or FIGS. 2 and 3 is mounted in the processor 200. In this case, the video quality improvement apparatus 100 may be mounted in the processor 200 in the form of at least one software module. As described above, the video quality improvement apparatus according to the present exemplary embodiment may include the processor 200 in a broad sense.

In addition, the video quality improvement apparatus may be implemented in the form of a plurality of software modules performing functions corresponding to each component of the video quality improvement apparatus based on machine learning or a computer-readable recording medium such as a memory storing a program.

In the above case, the program, which is stored in the memory and implements the video quality improvement method based on machine learning, may be implemented to include a series of processes for inputting a structure feature map converted from a current target frame, which is one of input frames, by a first convolution layer to a first multi-task unit and a second multi-task unit connected to an output side of the first multi-task unit among a plurality of multi-task units, inputting a main input obtained by adding a structure feature map to a feature space converted by a second convolution layer from those obtained by concatenating, in the channel dimension, a previous target frame, which is another one of the input frames, and a correction frame of the previous frame, which is still another one of the input frames to the first multi-task unit, and inputting the current target frame to an $N^{th}$ multi-task unit connected to the end of an output side of the second multi-task unit.

In addition, the program may be implemented to include a process of providing an $N^{th}$ deblurred feature map of the previous target frame generated by the $N^{th}$ multi-task unit to all other multi-task units, such as the first multi-task unit and the second multi-task unit.

Further, the program may be implemented to include a series of processes of receiving the main input by a first detail feature map network of the first multi-task unit and outputting a first detail feature map, converting a structure-injected feature map in which the structure feature map is added to the first detail feature map by the motion layer of the compensation network of the first multi-task unit into a current frame feature map, estimating a motion between the current frame feature map and the previous frame feature map of the previous target frame by a motion compensation module of the compensation network and aligning a deblurred feature map of the previous target frame with the current target frame on the basis of the estimated motion, and outputting the first deblurred feature map, in which the aligned deblurred feature map of the previous target frame is concatenated to the first detail feature map in the channel dimension through a connection network of the compensation network, to an input side of a second multi-task unit.

Further, the program may be implemented to include a process of converting the first detail feature map into an output residual image by a deblur layer of a first deblurring network of the first multi-task unit, and outputting a first correction frame to which the current target frame is added through a skip connection connected to an output side of the deblur layer, during training of a network including the multi-task units. The first correction frame may be used to update weights of the first multi-task unit.

Further, the program may be implemented to include a process of performing machine learning of a video quality improvement model using a loss function or an objective function calculated through a correction frame, which is an image quality improvement frame for the current target frame output from the $N^{th}$ multi-task unit.

In other words, the video quality improvement method based on machine learning described through the above-described exemplary embodiments may be implemented in the form of program commands that may be carried out through various computer devices and recorded in a computer-readable medium. The computer-readable medium may include program instructions, data files, data structures, and the like alone or in a combination thereof. The program instructions recorded in the computer-readable medium may be specially designed and configured for the present disclosure or may be available to those skilled in the computer software.

Examples of the computer-readable media include a hardware device that is specially configured to store and carry out program instructions, such as a read-only memory (ROM), a random access memory (RAM), a flash memory, and the like. Examples of program instructions include machine code, such as those created by a compiler, as well as high-level language codes that may be executed by a computer using an interpreter or the like. The above-described hardware device may be configured to operate with at least one software module to perform a series of operations of the video quality improvement method based on machine learning according to the present exemplary embodiment, and vice versa.

Video deblurring results of the video quality improvement apparatus according to the above-described exemplary embodiment are shown in [Table 2] below as an effect for each module.

TABLE 2

| Components | | | | Motion compensation | | Deblurring | |
| --- | --- | --- | --- | --- | --- | --- | --- |
| $L_{deblur}$ | M | $L_{motion}$ | motion layer | PSNR | SSIM | PSNR | SSIM |
| ✓ | | | | — | — | 29.79 | 0.915 |
| ✓ | ✓ | | | 24.59 | 0.851 | 29.93 | 0.916 |
| ✓ | ✓ | ✓ | | 26.10 | 0.887 | 29.72 | 0.913 |
| ✓ | ✓ | ✓ | ✓ | 26.10 | 0.886 | 30.05 | 0.918 |

Table 2 shows quantitative effects for each module of the video quality improvement method according to the present exemplary embodiment. Quantitative values represent results by networks (N=2) in which two multi-task units are stacked. As can be seen from Table 2, it can be seen that there is an increase in deblurring performance only by using a compensation network M (a second column from the left in Table 2).

Further, during learning, compensation performance increases but deblurring performance decreases (a third column of Table 2). However, it can be seen that as structure-detail separation-based learning is completed, the deblurring performance is greatly increased (see the last row on the left (a fourth row) of Table 2) by using a motion layer (refer to the compensation network $M''$ of FIG. 3).

Next, FIGS. 5(a) through 5(f) and Table 3 show quantitative performance evaluation results for progressive deblurring-compensation of the video quality improvement apparatus according to the present exemplary embodiment.

FIGS. 5(a) through 5(f) provide a set of views illustrating quantitative and qualitative results for the progressive deblurring-compensation by the video quality improvement apparatus of FIG. 1. FIG. 5(a) illustrates an input corresponding to a current target frame, FIG. 5(b) illustrates an output result in a first deblurring network $D^1$ of a first multi-task unit, FIG. 5(c) illustrates an output result in a second deblurring network $D^2$ of a second multi-task unit, FIG. 5(d) illustrates an output result in a third deblurring network $D^3$ of a third multi-task unit, FIG. 5(e) illustrates an output result in a fourth deblurring network $D^4$ of a fourth multi-task unit, and FIG. 5(f) illustrates an output result in a fifth deblurring network $D^5$ of a fifth multi-task unit.

TABLE 3

|  | $(-, \mathcal{D}^1)$ | $(\mathcal{M}^1, \mathcal{D}^2)$ | $(\mathcal{M}^2, \mathcal{D}^3)$ | $(\mathcal{M}^3, \mathcal{D}^4)$ | $(\mathcal{M}^4, \mathcal{D}^5)$ |
|---|---|---|---|---|---|
| Motion compensation | — | 24.29 | 24.61 | 24.87 | 24.88 |
| Deblurring | 24.54 | 15.82 | 26.65 | 27.50 | 27.77 |

As shown in Table 3 and FIGS. 5(a) through 5(f), as a result of evaluating the performance of a video quality improvement network (N=5) in which five multi-task units each having at least one of compensation networks $M^1$, $M^2$, $M^3$, and $M^4$ and the deblurring network $D^1$, $D^2$, $D^3$, $D^4$, and $D^5$ are stacked, it can be seen that compensation performance and deblurring performance are progressively increased in the video quality improvement apparatus according to the present exemplary embodiment.

FIGS. 6(a) through 6(f) provide a set of views illustrating comparison of quantitative and qualitative results of the video quality improvement apparatus of FIG. 1 and comparative examples.

Referring to FIGS. 6(a) through 6(f) and Table 4, as a result of comparing the performance of the video quality improvement network (N=10) of the present exemplary embodiment in which 10 multi-task units are stacked and the performance of the comparative examples, it can be seen that the present exemplary embodiment in which four multi-task units are stacked ((e)Ours (4-stack)) and the present exemplary embodiment in which 10 multi-task units are stacked ((f)Ours (10-stack)) show the highest deblurring performance for the input (a) even though a computation amount and a computation size of each of the present exemplary embodiment in which four multi-task units are stacked ((e)Ours (4-stack)) and the present exemplary embodiment in which 10 multi-task units are stacked ((f) Ours (10-stack)) are less than those of comparative examples ((b)IFIRNN, (c)STFAN, (d)ESTRNN).

TABLE 4

|  | Nab et al. | Tab et al. | DVD | IFIRNN | STFAN | ESTRNN | Ours (n-stack) | | |
|---|---|---|---|---|---|---|---|---|---|
|  |  |  |  |  |  |  | 2 | 4 | 10 |
| PSNR (dB) | 29.59 | 30.24 | 30.05 | 30.78 | 31.24 | 31.02 | 30.54 | 31.07 | 31.56 |
| Params (M) | 75.92 | 3.76 | 15.31 | 1.64 | 5.37 | 6.71 | 0.92 | 1.89 | 4.78 |
| Time (ms) | 1790 | 560 | 581 | 54 | 145 | 63 | 9 | 14 | 31 |

In the case of using the video quality improvement method and apparatus based on machine learning described above, multi-task units can harmoniously learn an image quality improvement task and a compensation task that require feature maps with conflicting characteristics by adopting a structure-detail separation-based learning structure in a video quality improvement network in which the multi-task units are stacked.

Further, a multi-task unit is implemented by a network module with a relatively light and very low computation amount as compared with the existing method and apparatus, and a plurality of multi-task units are stacked and implemented to operate as progressive automatic image quality improvement and compensation units, so that deblurring performance can be remarkably improved by using surrounding frames in video quality improvement, compensating the surrounding frames, and progressively performing the image quality improvement and the compensation.

Further, a structure-detail separation-based machine learning method and apparatus for progressive video quality improvement can be provided, thereby contributing to machine learning of a video quality improvement model being effectively performed.

Further, according to the present disclosure, there is an effect of being able to effectively improve image quality while reducing a high computation amount required for compensation, which was wasted in the related art, when multi-task units progressively perform image quality improvement and compensation, through a structure-detail separation-based learning method that allows the multi-task units to have a low computation amount.

While the exemplary embodiments of the present disclosure and their advantages have been described in detail, it should be understood that various changes, substitutions and alterations may be made herein without departing from the scope of the present disclosure.

What is claimed is:

1. A video quality improvement method performed by a processor of a video quality improvement apparatus in which a video quality improvement model based on a convolutional neural network in which a plurality of multi-task units are stacked is machine-learned, the method comprising:

inputting a structure feature map to a first multi-task unit and a second multi-task unit, which is connected to an output side of the first multi-task unit, among the plurality of multi-task units, wherein the structure feature map is converted from a current target frame, which is one of input frames, by a first convolution layer, wherein the plurality of multi-task units include the first multi-task unit, the second multi-task unit connected to an output side of the first multi-task unit, and an Nth multi-task unit connected to an end of an output side of the second multi-task unit, and wherein N is an arbitrary natural number greater than or equal to 3;

inputting a main input to the first multi-task unit, wherein the main input is obtained by adding the structure feature map to a feature space, which is converted by a second convolution layer from a group of frames obtained by concatenating, in a channel dimension, a previous target frame, which is another one of the input frames, and a correction frame of the previous target frame, which is still another one of the input frames; and inputting the current target frame to the first multi-task unit, the second multi-task unit and the $N^{th}$ multi-task unit, wherein the first multi-task unit outputs a first detail feature map to an input side of the second multi-task unit, the first detail feature map being generated by concatenating a detail feature map of the previous target frame with a first detail feature map generated by a first detail feature map network of the first multi-task unit in the channel dimension through a concatenation network of a compensation network of the first multi-task unit connected to an output side of the first detail feature map network, wherein the $N^{th}$ multi-task unit outputs a correction frame of the current target frame, and wherein machine learning of the video quality improvement model is performed using an objective function calculated through the correction frame of the current target frame.

2. The method of claim 1, further comprising inputting an $N^{th}$ detail feature map of the previous target frame generated in the $N^{th}$ multi-task unit to the first multi-task unit and the second multi-task unit.

3. The method of claim 2, further comprising:
receiving the main input by the first detail feature map network of the first multi-task unit and outputting a first detail feature map;
inputting a structure-injected feature map by a motion layer of the compensation network of the first multi-task unit, wherein the structure-injected feature map is generated by adding the structure feature map to the first detail feature map; and
converting, by the motion layer, the structure-injected feature map into a detail-structure feature map of the current target frame.

4. The method of claim 3, further comprising:
estimating a correlation for each pixel between the detail-structure feature map of the current target frame and a detail-structure feature map of the previous target frame by a motion compensator of the compensation network;
extracting an optical flow based on an offset of coordinates of a matching pixel having a largest correlation value for each pixel; and
concatenating a detail feature map of the previous target frame with a first detail feature map of the current target frame.

5. The method of claim 4, further comprising converting the first detail feature map into a residual frame by a deblur layer of a first deblurring network of the first multi-task unit, and outputting a first correction frame, the first correction frame being generated by adding the current target frame to the residual frame through a skip connection connected to an output side of the deblur layer,
wherein the first correction frame is used to update a weight of the first multi-task unit.

6. The method of claim 1, further comprising obtaining a root mean square deviation of the correction frame of the current target frame and a ground-truth frame to minimize an objective function, when the machine learning is performed.

7. The method of claim 6, further comprising obtaining cross entropy for each pixel of a correlation matrix generated in each compensation network of the first multi-task unit and the second multi-task unit using a supervised optical flow generated from a supervised frame of the previous target frame and a supervised frame of the current target frame to minimize the objective function, when the machine learning is performed.

8. A video quality improvement apparatus based on machine learning, the apparatus comprising:
a first convolution layer configured to generate a structure feature map by converting a current target frame that is one of input frames;
a second convolution layer configured to convert one obtained by concatenating, in a channel dimension, a previous target frame, which is another one of the input frames, and a correction frame of the previous target frame, which is still another one of the input frames to generate a feature space;
a connection network configured to generate a main input in which the structure feature map is for being added to the feature space;
a first multi-task unit based on a convolutional neural network, which is configured to receive the main input and the structure feature map and generate a first detail feature map of the current target frame through a first detail feature map network and a first compensation network connected to an output side of the first detail feature map network; and
an $N^{th}$ multi-task unit connected to an end of an output side of the first multi-task unit, and configured to receive the current target frame and output a correction frame of the current target frame through an $N^{th}$ detail feature map network and an $N^{th}$ deblurring network; and
an optimizer configured to obtain a root mean square deviation of the correction frame of the current target frame and a ground-truth frame to minimize an objective function,
wherein machine learning of a video quality improvement model is for being performed using an objective function calculated through the correction frame of the current target frame.

9. The apparatus of claim 8, further comprising one or more multi-task units including a second multi-task unit between the first multi-task unit and the $N^{th}$ multi-task unit,
wherein the second multi-task unit is connected to an output side of the first multi-task unit, and includes a second detail feature map network, a second deblurring network, and a second compensation network,
wherein the second detail feature map network is configured to receive the first detail feature map in which a first detail feature map generated by the first detail feature map network is for being concatenated with a detail feature map generated by the first compensation network in the channel dimension, and is configured to generate a detail feature map, and wherein the second compensation network is configured to generate a detail-structure feature map through a motion layer from a structure-injected feature map in which a second detail feature map is for being concatenated with the structure feature map, and is configured to generate a second detail feature map of the current target frame through the second compensation network from the detail-structure feature map, the second detail feature map for being generated by concatenating the detail feature map generated from the detail-structure feature map with the second detail feature map in the channel dimension.

10. The apparatus of claim 9, wherein an $N^{th}$ detail feature map of the previous target frame generated in the $N^{th}$ multi-task unit is for being input into one or more multi-task units including the first multi-task unit and the second multi-task unit.

11. The apparatus of claim 8, wherein the first multi-task unit includes the first detail feature map network configured to receive the main input and generate a first detail feature map, and the first compensation network configured to connect to an output side of the first detail feature map network and convert a structure-injected feature map, in which the structure feature map is for being added to the first detail feature map by a motion layer, into a detail-structure feature map of the current target frame.

12. The apparatus of claim 11, wherein the first compensation network further includes:
- a motion compensator configured to estimate a correlation for each pixel between the detail-structure feature map of the current target frame and a detail-structure feature map of the previous target frame, and to extract an optical flow based on an offset of coordinates of a matching pixel having a largest correlation value for each pixel; and
- a concatenation network connected to an output side of the motion compensator and configured to concatenate a detail feature map of the previous target frame with a first detail feature map of the current target frame and output the first detail feature map to an input side of a second multi-task unit, wherein the first detail feature map is for being generated by concatenating the detail feature map of the previous target frame with the first detail feature map in the channel dimension through the concatenation network.

13. The apparatus of claim 12, wherein the first multi-task unit further includes a first deblurring network configured to convert the first detail feature map into a residual frame using a deblur layer and output a first correction frame, the first correction frame for being generated by adding the current target frame to the residual frame through a skip connection connected to an output side of the deblur layer, and wherein the first correction frame is for being used to update a weight of the first multi-task unit.

14. The apparatus of claim 8, wherein the optimizer is further configured to minimize the objective function by obtaining cross entropy for each pixel of a correlation matrix generated in a compensation network of the first multi-task unit using a supervised optical flow generated from a supervised frame of the previous target frame and a supervised frame of the current target frame.

\* \* \* \* \*